(12) United States Patent
Bellis et al.

(10) Patent No.: US 12,708,105 B1
(45) Date of Patent: Aug. 18, 2026

(54) LIVESTOCK EVALUATION SYSTEM AND METHOD OF USE

(71) Applicants: Shannon Bellis, Athens, TX (US); Garren Bellis, Athens, TX (US)

(72) Inventors: Shannon Bellis, Athens, TX (US); Garren Bellis, Athens, TX (US)

( * ) Notice: Subject to any disclaimer, the term of this patent is extended or adjusted under 35 U.S.C. 154(b) by 0 days.

(21) Appl. No.: 18/213,171

(22) Filed: Jun. 22, 2023

Related U.S. Application Data

(60) Provisional application No. 63/354,545, filed on Jun. 22, 2022.

(51) Int. Cl.
*A01K 29/00* (2006.01)

(52) U.S. Cl.
CPC .................................. *A01K 29/005* (2013.01)

(58) Field of Classification Search
None
See application file for complete search history.

(56) References Cited

U.S. PATENT DOCUMENTS

2013/0275316 A1* 10/2013 Teng ...................... A01K 29/00 705/317
2023/0049090 A1* 2/2023 Jeon ...................... A01K 29/00

* cited by examiner

*Primary Examiner* — Thomas S McCormack
(74) *Attorney, Agent, or Firm* — Richard Eldredge; Leavitt Eldredge Law Firm

(57) ABSTRACT

A livestock evaluation system for identifying the soundness of the livestock, comprising, a livestock evaluation application, a user profile, an interface, and a server. The interface provides a secure connection between the user and the server, and the user profile requiring specific livestock evaluation uploads the photos of livestock on the server. The livestock evaluation application uses an algorithm to identify structural components of livestock and the points are identified marking the major joints and skeletal features of livestock. The livestock can be cattle, horse, sheep, deer, and any other similar animal.

2 Claims, 4 Drawing Sheets

LIVESTOCK EVALUATION SYSTEM AND METHOD OF USE

CROSS-REFERENCE TO RELATED APPLICATIONS

This application claims priority of a provisional U.S. application Ser. No. 63/354,545 filed on Jun. 22, 2022, which is hereby incorporated by reference in its entirety.

BACKGROUND

1. Field of the Invention

The present invention relates generally to livestock evaluation systems, and more specifically, to a livestock evaluation system that identifies structural components of livestock animals, such as cattle, horses, sheep, deer, and any other similar animal for evaluation of the animal.

2. Description of Related Art

Livestock evaluation typically involves a human visually inspecting an animal for structural components. This can be valuable in ranching and other operations to understand the animals and breed to improve the quality of animals. One problem with these systems is human error, for example, a human uses subject evaluations to determine features of the animals.

Accordingly, it would be desirable to provide a system that utilizes a computing environment with one or more programs and algorithms to identify the structural components of animals.

DESCRIPTION OF THE DRAWINGS

The appended claims set forth the novel features believed characteristic of the embodiments of the present application. However, the embodiments themselves, as well as a preferred mode of use, and further objectives and advantages thereof, will best be understood by reference to the following detailed description when read in conjunction with the accompanying drawings, wherein:

Figure 1:
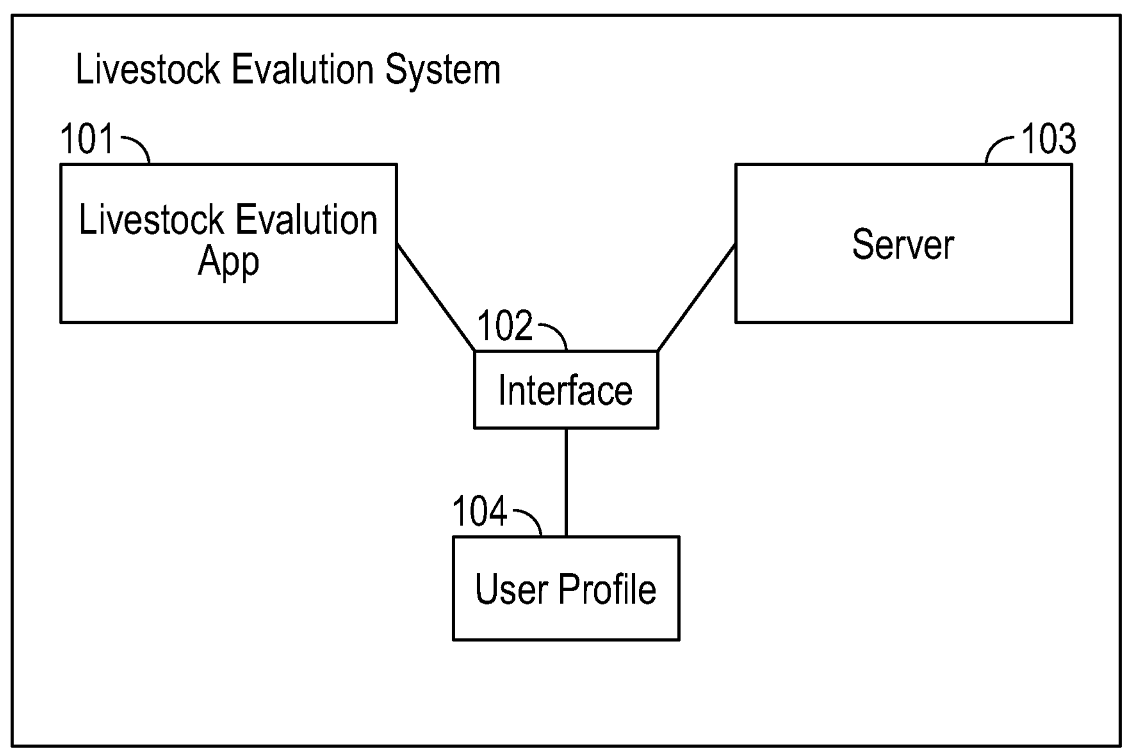
FIG. 1 is an illustration of key components of the livestock evaluation system of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcome one or more of the above-discussed problems commonly associated with conventional livestock evaluation systems. Specifically, the present invention provides for the use of a computer environment to identify the structural components of an animal to provide improved information for the user to identify the soundness of the animal. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Core ML applies a machine learning algorithm to a set of training data to create a model. One may use a model to make predictions based on new input data. Models can accomplish a wide variety of tasks that would be difficult or impractical to write in code. For example, you can train a model to categorize photos or detect specific objects within a photo directly from its pixels.

After creating the model, it is integrated into the app and deployed on the user's device. The livestock evaluation app uses Core ML APIs and user data to make predictions and to train or fine-tune the model.

Core ML delivers fast performance on Apple devices with easy integration of machine learning models into the apps. Prebuilt machine learning features can be added to the apps using APIs powered by Core ML or use Create ML to train custom Core ML models right on the Mac. One can also convert models from other training libraries using Core ML Converters or download ready-to-use Core ML models. Easily preview the model and understand its performance right in Xcode.

Embodiments may comprise a computer program that embodies the functions described and illustrated herein, wherein the computer program is implemented in a computer system that comprises instructions stored in a machine-readable medium and a processor that executes the instructions. It should be appreciated that there may be many different ways of implementing embodiments in computer programming and the embodiments should not be construed as limited to any one set of computer program instructions. Further, a skilled programmer would be able to write such a computer program to implement an embodiment of the disclosed embodiments based on the appended flowcharts and associated descriptions in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more digital systems. Moreover, any reference to an act being performed by a computer should not be construed as being performed by a single computer as more than one computer may perform the act.

The online or mobile applications described in the present invention can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held digital devices, microprocessor-based or programmable consumer electronics, and the like, each of which can be operatively coupled to one or more associated devices.

A digital device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media.

Computer storage media can include volatile and/or non-volatile media, removable and/or non-removable media implemented in any method or technology for storage of information, such as computer-readable instructions, data structures, program modules, or other data. Computer storage media can include but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The interface embodies a mobile user interface, or mobile UI, is the display or screen on a mobile device. It's the space where users can interact with what's on the screen from menu buttons to text fields (and everything in between, depending on whether users can tap, scroll, swipe, type, or just see it).

Referring now to the drawings wherein reference characters identify corresponding or similar elements throughout the several views, FIGS. 1-4 depict images showing the structural identification of animals using the livestock evaluation system 100 and its method of use in accordance with preferred embodiments of the present application.

The livestock evaluation system 100 of the present invention includes a livestock evaluation app 101, an interface 102, a server 103, and a user profile 104, as shown in FIG. 1.

The livestock evaluation system 100 of the present invention can be configured to be compatible with any kind of system including but not limited to iOS, Apple, android, google, etc.

The livestock evaluation system 100 of the present invention utilizes one or more algorithms to identify structural components of an animal, specifically a livestock animal, wherein the identified points capture major joints and skeletal features through computer automation. This allows a user to evaluate the structural composition of the animal, which contributes to animal soundness.

Figure 2:
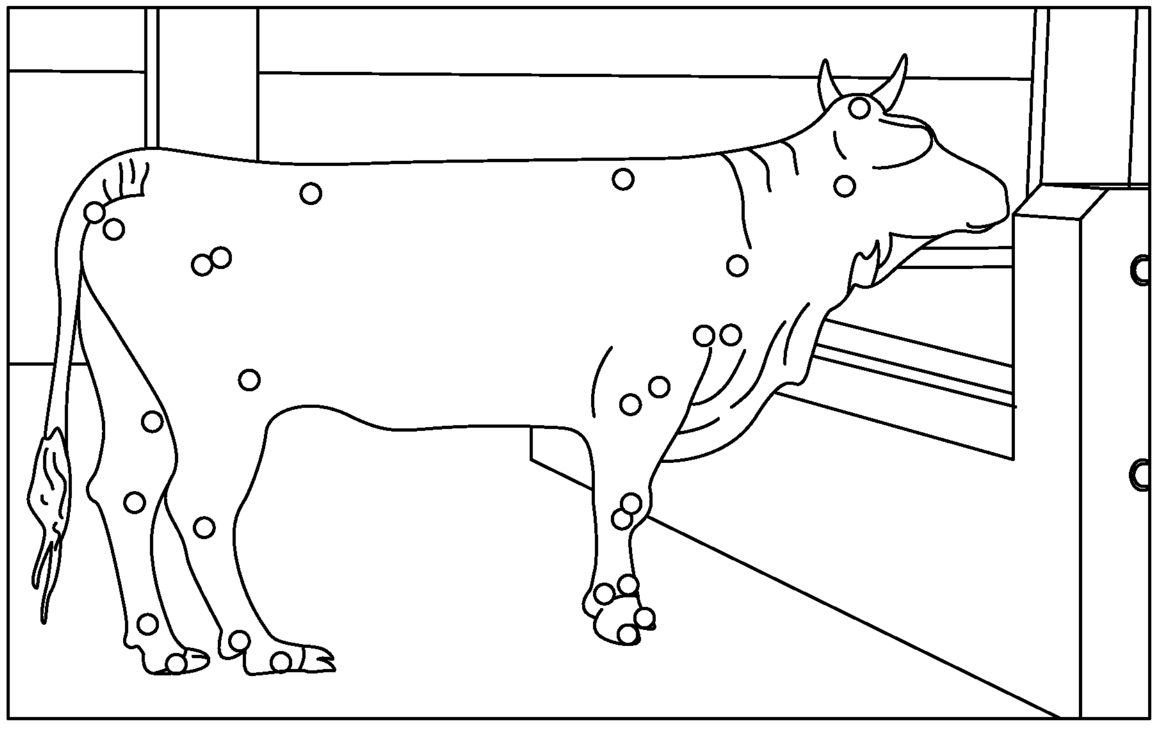
FIG. 2 shows the capturing of structural components of an animal in accordance with the operation of the livestock evaluation system of the present invention.
Figure 3:
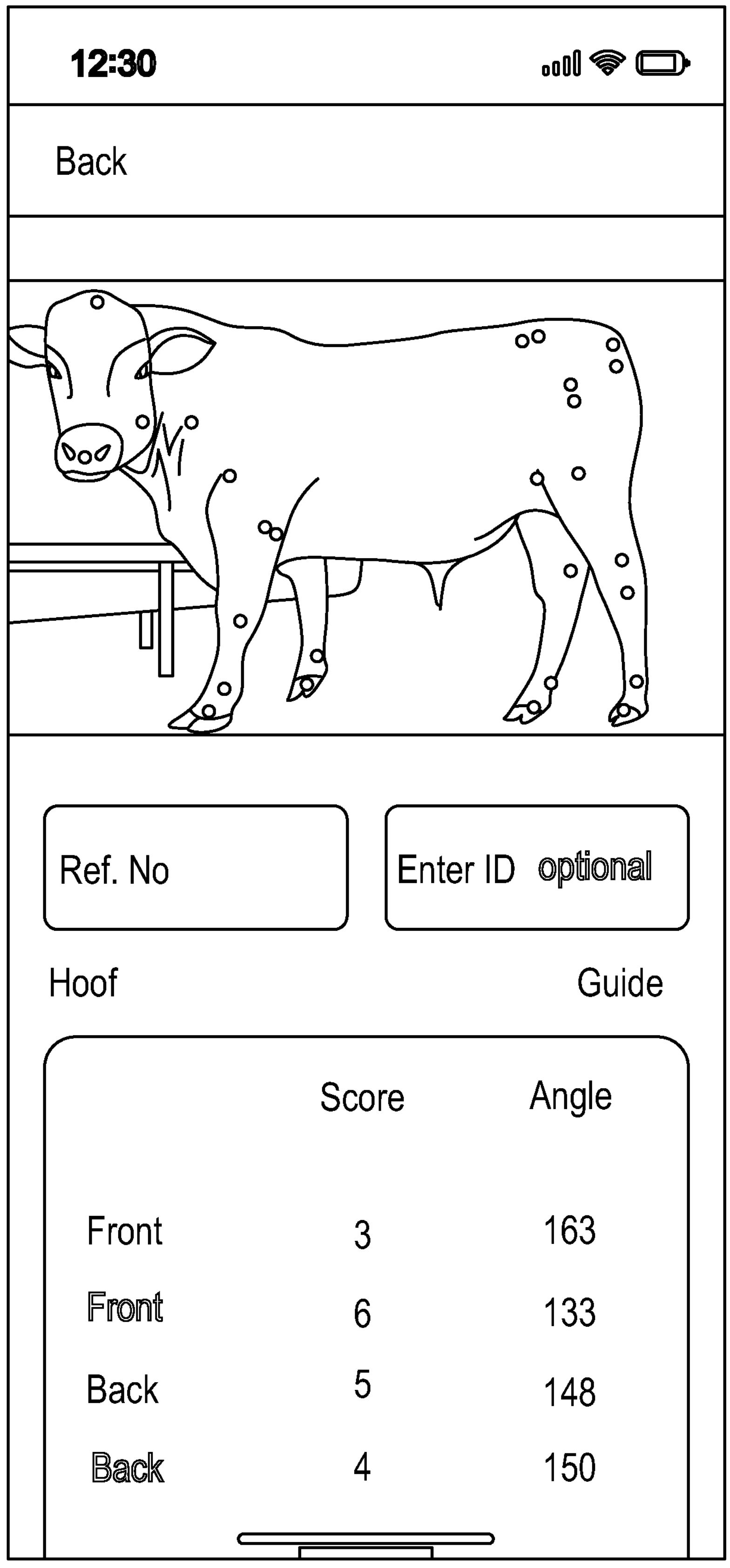
FIG. 3 shows the interface of the livestock evaluation system used for the skeleton evaluation of livestock.

As shown in FIGS. 2-3, lines may extend between identified points, such as major joints, which will provide for information to calculate the angles of the animal's skeleton. The photo will be uploaded to a server, wherein one or more algorithms will self-identify major skeleton features, and then return to the user the associated identification of those areas and the angle measurements.

Figure 4:
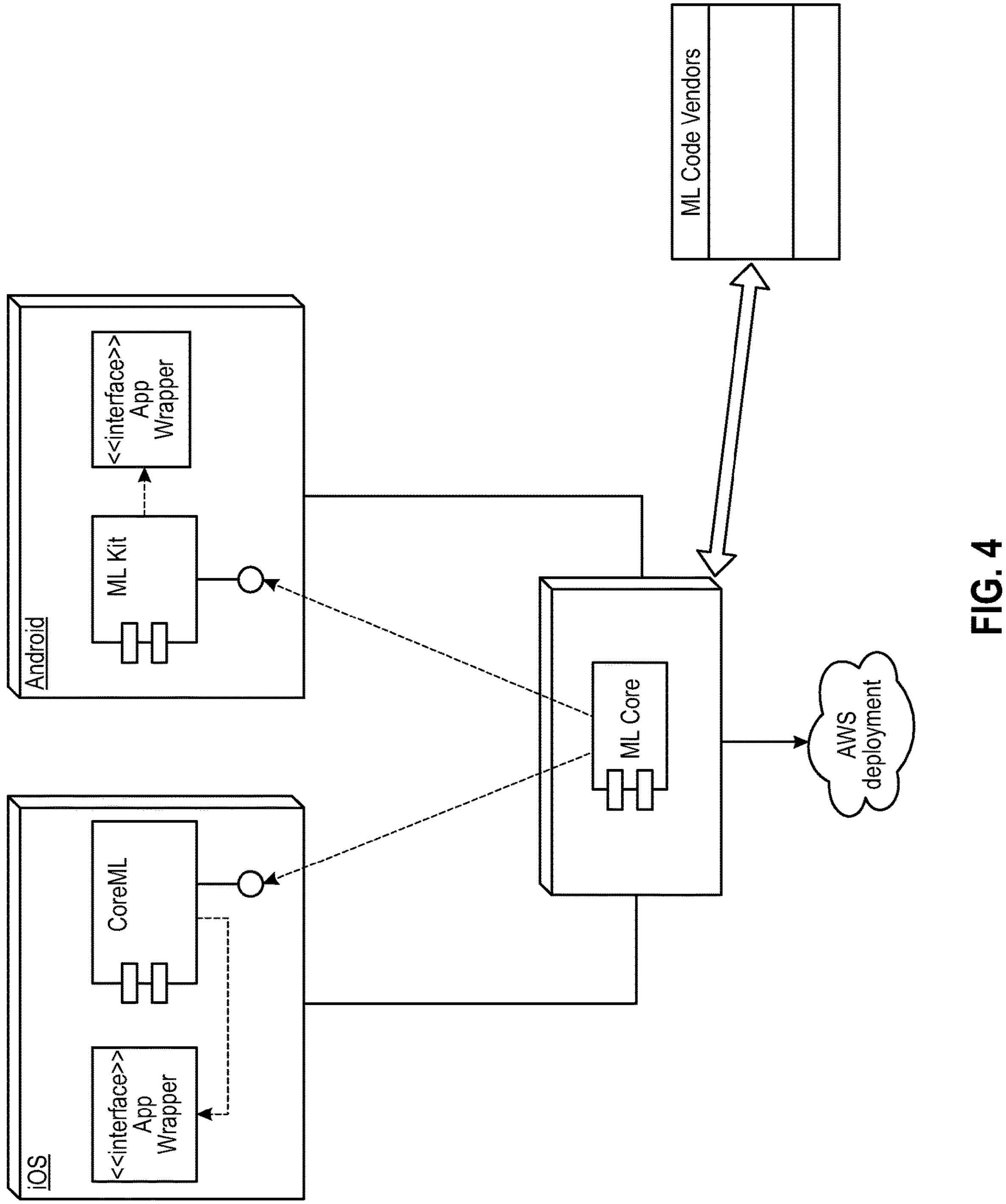
FIG. 4 shows the flow diagram of the method of use of the livestock evaluation system of the present invention.

As shown in FIG. 4, the flow diagram depicting the method of use of the livestock evaluation system 100 includes a digital device on which the images of the livestock are captured and the photos are uploaded to a server using an iOS interface with CoreML which utilizes Amazon Web Services (AWS) ML core code. The livestock evaluation system 100 includes 2 actual ML library vendors with code built on, preferably vendors can be ultralytics or Nvidia. Those are segmented off from the phone itself, essentially blind to any process that isn't the directions encapsulated in the ML core code.

As shown in FIG. 4, the flow diagram depicting the method of use of the livestock evaluation system 100 includes a digital device on which the images of the livestock are captured and the photos are uploaded to a server using an Android interface with ML Kit (name can change) which utilizes Amazon Web Services (AWS) ML core code. The livestock evaluation system 100 includes 2 actual ML library vendors with code built on, preferably vendors can be ultralytics or Nvidia. Those are segmented off from the phone itself, essentially blind to any process that isn't the directions encapsulated in the ML core code.

It should be appreciated that one of the unique features believed characteristic of the present application is the creation of a plurality of data points associated with structural features of the animal, with the connection of at least some of those data points to provide for information to evaluate the animal for soundness.

It should be appreciated that the system of the present invention will utilize a plurality of images and may further utilize machine learning and/or artificial intelligence to improve over time based on an increase in data.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A livestock evaluation system for identifying the soundness of the livestock, comprising:

a livestock evaluation application;

a user profile;

an interface;

a server;

a camera to capture an image of the livestock;

wherein the interface provides a secure connection between the user and the server;

wherein the user profile requiring specific livestock evaluation uploads the photo of the livestock on the server;

wherein the livestock evaluation application uses an algorithm to identify the major joints and skeletal features of the livestock via the image captured on the camera and is configured to assign a score and display the score on a display of the interface;

wherein a plurality of points are identified from the image, which in turn mark major joints and skeletal features of the livestock.

2. The livestock evaluation system of claim 1, wherein the livestock can be cattle, horse, sheep, deer, and any other similar animal.

* * * * *